(12) United States Patent
Dodson et al.

(10) Patent No.: US 8,797,857 B2
(45) Date of Patent: *Aug. 5, 2014

(54) DYNAMIC BUFFER POOL IN PCIEXPRESS SWITCHES

(75) Inventors: Jeffrey Michael Dodson, Portland, OR (US); Joe Keirouz, Fremont, CA (US)

(73) Assignee: PLX Technology, Inc., Sunnyvale, CA (US)

(*) Notice: Subject to any disclaimer, the term of this patent is extended or adjusted under 35 U.S.C. 154(b) by 918 days.

This patent is subject to a terminal disclaimer.

(21) Appl. No.: 12/957,237

(22) Filed: Nov. 30, 2010

(65) Prior Publication Data

US 2011/0069704 A1  Mar. 24, 2011

Related U.S. Application Data

(63) Continuation of application No. 12/336,402, filed on Dec. 16, 2008, now Pat. No. 7,869,356.

(60) Provisional application No. 61/014,685, filed on Dec. 18, 2007.

(51) Int. Cl.
*H04J 1/16* (2006.01)
*H04L 12/56* (2006.01)

(52) U.S. Cl.
CPC ............... *H04L 47/30* (2013.01); *H04L 47/10* (2013.01)
USPC ........................................................ 370/230

(58) Field of Classification Search
CPC ..... H04L 1/1835; H04L 1/1874; H04L 12/40; H04L 47/10; H04L 47/30; H04L 49/90
USPC ......... 370/229, 230, 231, 351, 357, 360, 362, 370/389, 412, 464, 480, 489, 498, 501, 502
See application file for complete search history.

(56) References Cited

U.S. PATENT DOCUMENTS

| 7,675,929 | B1 | 3/2010 | Davis |
| 2005/0259651 | A1 | 11/2005 | Yashima |
| 2007/0208899 | A1 | 9/2007 | Freking et al. |
| 2009/0113082 | A1 | 4/2009 | Adar et al. |

*Primary Examiner* — Obaidul Huq
(74) *Attorney, Agent, or Firm* — Beyer Law Group LLP

(57) ABSTRACT

In a first embodiment of the present invention, a method for handling a Transaction Layer Packets (TLPs) from devices in a switch is provided, the method comprising: subtracting a first number of credits from a credit pool associated with a first port on which a first device is connected; determining if the amount of credits in the credit pool associated with the first port is less than a first predetermined threshold; and if the amount of credits in the credit pool associated with the first port is less than the first predetermined threshold, assigning a second number of credits from a shared credit pool to the credit pool associated with the first port.

10 Claims, 8 Drawing Sheets

DYNAMIC BUFFER POOL IN PCIEXPRESS SWITCHES

CROSS REFERENCE TO RELATED APPLICATIONS

This patent application is a continuation of U.S. patent application Ser. No. 12/336,402, filed on Dec. 16, 2008 now U.S. Pat No. 7,869,356, which takes priority under 35 U.S.C. 119(e) to U.S. Provisional Patent Application No. 61/014, 685, filed on Dec. 18, 2007, entitled "PLX ARCHITECTURE", by Jeff Dodson, Nagamanivel Balasubramaniyan, and Joe Keirouz. Both of the foregoing applications are incorporated by reference in their entirety for all purposes.

BACKGROUND OF THE INVENTION

1. Field of the Invention

The present invention relates generally to PCIExpress (PCIe). More particularly, the present invention relates to a dynamic buffer pool in a PCIExpress switch.

2. Description of the Related Art

In a computer architecture, a bus is a subsystem that transfers data between computer components inside a computer or between computers. Unlike a point-to-point connection, a different type of computer input/output (I/O) interconnect, a bus can logically connect several peripherals over the same set of wires. Each bus defines its set of connectors to physically plug devices, cards or cables together.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to run must faster.

Recently, a successor to PCI has been popularized. Termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

PCI Express utilizes credit-based flow control. In this scheme, a device advertises an initial amount of credit for each of the receive buffers in its Transaction Layer. The device at the opposite end of the link, when sending transactions to this device, will count the number of credits consumed by each Transaction Layer Packet (TLP) from its account. The sending device may only transmit a TLP when doing so does not result in its consumed credit count exceeding its credit limit. When the receiving device finishes processing the TLP from its buffer, it signals a return of credits to the sending device, which then increases the credit limit by the restored amount. The credit counters are modular counters, and the comparison of consumed credits to credit limit requires modular arithmetic. The advantage of this scheme (compared to other methods such as wait states or handshake-based transfer protocols) is that the latency of credit return does not affect performance, provided that the credit limit is not encountered. This assumption is generally met if each device is designed with adequate buffer sizes.

As data rates increase, the rate of usage of credits also increases. If one assumes a fairly constant credit update response time, then as data rate goes up more credits can be consumed in the constant time. Then short TLPs need more header credits, as short TLPs burn through header credits quickly. Long TLPs need more payload credits and a single header credit, as long TLPs burn through payload credits quickly. All of this can be difficult to manage using fixed credits, as different applications have different mixed of traffic and, for optimal performance, fixed credits need to have the maximum credits for each permutation, which is also expensive in terms of requiring the most hardware resources.

SUMMARY OF THE INVENTION

In a first embodiment of the present invention, a method for handling a Transaction Layer Packets (TLPs) from devices in a switch is provided, the method comprising: subtracting a first number of credits from a credit pool associated with a first port on which a first device is connected; determining if the amount of credits in the credit pool associated with the first port is less than a first predetermined threshold; and if the amount of credits in the credit pool associated with the first port is less than the first predetermined threshold, assigning a second number of credits from a shared credit pool to the credit pool associated with the first port.

In a second embodiment of the present invention, a method for handling Transaction Layer Packets (TLPs) from devices in a switch is provided using a single shared header/payload pool, wherein the TLPs have sizes and contain a header and a payload, the method comprising: subtracting a first number of credits from a header credit pool associated with a first port on which a first device is connected; determining if the amount of credits in the header credit pool associated with the first port is less than a first predetermined threshold; if the amount of credits in the header credit pool associated with the first port is less than the first predetermined threshold, assigning a second number of credits from a shared credit pool to the header credit pool associated with the first port; subtracting a third number of credits from a payload credit pool associated with the first port; determining if the amount of credits in the payload credit pool associated with the first port is less than a second predetermined threshold; and if the amount of credits in the payload credit pool associated with the first port is less than the second predetermined threshold, assigning a fourth number of credits from the shared credit pool to the payload credit pool associated with the first port.

In a third embodiment of the present invention, a method for handling a Transaction Layer Packets (TLPs) from device in a switch is provided using separate shared header and payload credit pools, wherein the TLPs have sizes and contain a header and a payload, the method comprising: subtracting a first number of credits from a header credit pool associated with a first port on which a first device is connected; determining if the amount of credits in the header credit pool associated with the first port is less than a first predetermined threshold; if the amount of credits in the header credit pool associated with the first port is less than the first predetermined threshold, assigning a second number of credits from a shared header credit pool to the header credit pool associated with the first port; subtracting a third number of credits from a payload credit pool associated with the first port; determining if the amount of credits in the payload credit pool associated with the first port is less than a second predetermined threshold; and if the amount of credits in the payload credit pool associated with the first port is less than the second predetermined threshold, assigning a fourth number of credits from a shared payload credit pool to the payload credit pool associated with the first port.

In a fourth embodiment of the present invention, a switch is provided comprising: a plurality of ports; for each of said plurality of ports, stored in a memory, a credit pool associated with the port; a shared credit pool stored in a memory; a processor configured to: subtract a first number of credits from a credit pool associated with a first port on which a first device is connected; determine if the amount of credits in the credit pool associated with the first port is less than a first predetermined threshold; and if the amount of credits in the credit pool associated with the first port is less than the first predetermined threshold, assign a second number of credits from a shared credit pool to the credit pool associated with the first port.

In a fifth embodiment of the present invention, a switch is provided using a single shared header/payload pool, comprising: a plurality of ports; for each of said plurality of ports, stored in a memory, a header credit pool and a payload credit pool associated with the port; a shared credit pool stored in a memory; a processor configured to: subtract a first number of credits from a header credit pool associated with a first port on which a first device is connected; determine if the amount of credits in the header credit pool associated with the first port is less than a first predetermined threshold; if the amount of credits in the header credit pool associated with the first port is less than the first predetermined threshold, assign a second number of credits from a shared credit pool to the header credit pool associated with the first port; subtract a third number of credits from a payload credit pool associated with the first port; determine if the amount of credits in the payload credit pool associated with the first port is less than a second predetermined threshold; and if the amount of credits in the payload credit pool associated with the first port is less than the second predetermined threshold, assign a fourth number of credits from the shared credit pool to the payload credit pool associated with the first port.

In a sixth embodiment of the present invention, a switch is provided using separate shared header and payload credit pools, comprising: a plurality of ports; for each of said plurality of ports, stored in a memory, a header credit pool and a payload credit pool associated with the port; a shared credit pool stored in a memory; a shared payload credit pool stored in a memory; a processor configured to: subtract a first number of credits from a header credit pool associated with a first port on which a first device is connected; determine if the amount of credits in the header credit pool associated with the first port is less than a first predetermined threshold; if the amount of credits in the header credit pool associated with the first port is less than the first predetermined threshold, assign a second number of credits from a shared header credit pool to the header credit pool associated with the first port; subtract a third number of credits from a payload credit pool associated with the first port; determine if the amount of credits in the payload credit pool associated with the first port is less than a second predetermined threshold; and if the amount of credits in the payload credit pool associated with the first port is less than the second predetermined threshold, assign a fourth number of credits from a shared payload credit pool to the payload credit pool associated with the first port.

DETAILED DESCRIPTION OF SPECIFIC EMBODIMENTS

Figure 1:
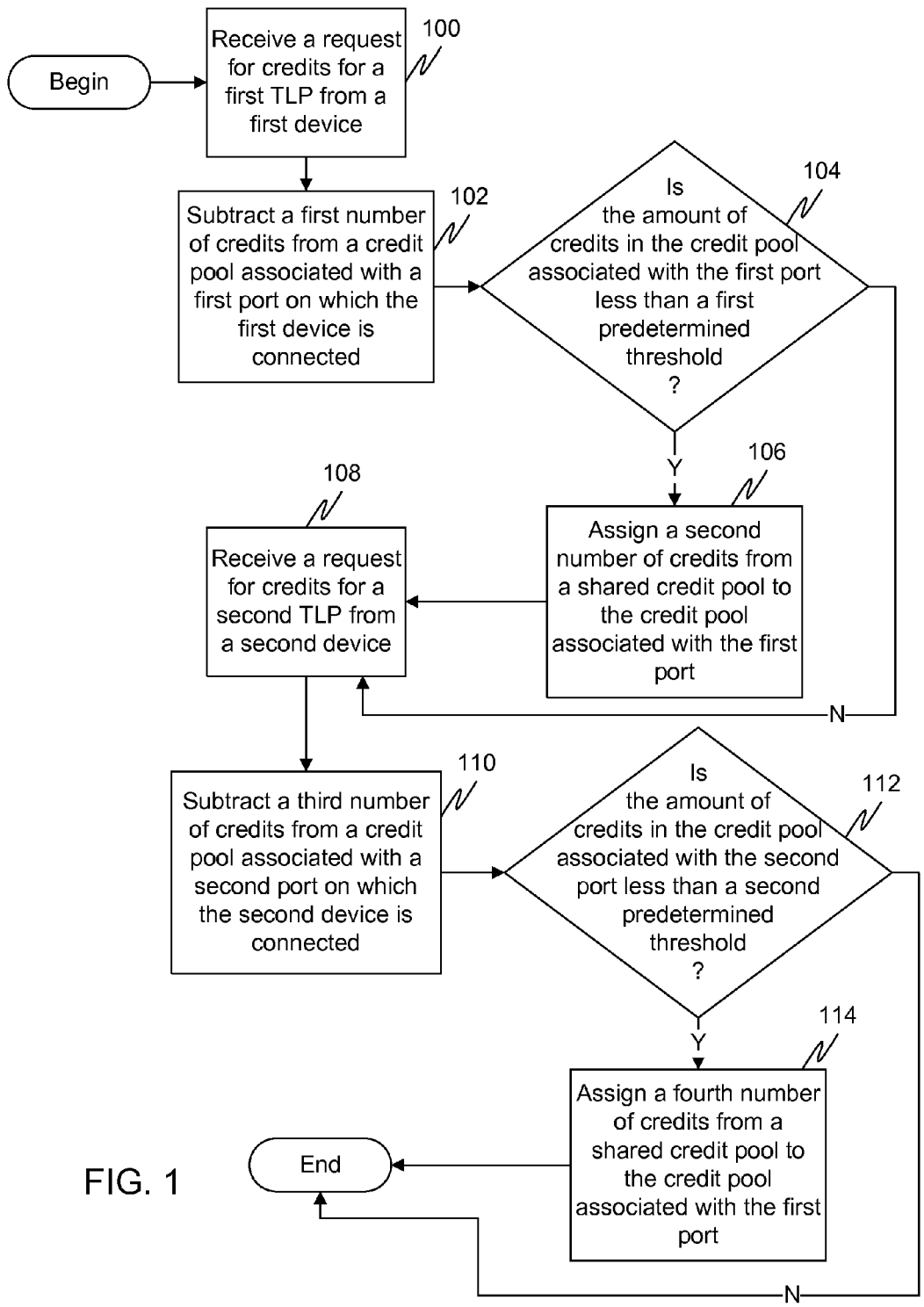
FIG. 1 is a flow diagram illustrating a method for handling Transaction Layer Packets (TLPs) from devices in a switch in accordance with a first embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a dynamic buffer pool is introduced into a PCIe switch. By utilizing the dynamic buffer pool, the initial credits are fixed per port, but a shared buffer pool of credits may be dynamically assigned when one of the port pool's initial credits are running low or dried up.

Flow Control (FC) is used to prevent overflow of receiver buffers and to enable compliance with deadlock avoidance rules. The Flow Control mechanism is used by the requester to track the buffer space available in an Agent across a Link.

Each virtual channel may maintain an independent flow control credit pool. Flow control is handled by the transaction layer in cooperation with the data link layer. The transaction layer performs flow control accounting functions for received TLPs and gates TLP transmissions based on available credits.

In the implementation with two credit types (header and payload), the corresponding credits may represent different units. For example, a header credit may equal one header while a payload credit may represent 16 bytes of data.

In an embodiment of the present invention, an uplink device sends a TLP to a PCIe switch and the switch takes buffer credit from the Port Pool associated with the device. The amount of available credits in the Port Pool is checked, but if it is lower than a set threshold it will use the next credit from a shared pool. Credits may be announced on total available credits including the shared pool credits.

One of the main advantages of dynamic credit is the initial credit advertisement needs only be large enough to replenish the initial credit from the shared pool, rather than large enough to accommodate the latency of the TLP leaving the chip. A shared pool can accommodate bursty traffic as needed by using credits that would otherwise have been reserved for an idle port.

This scheme also uses less memory on the device than a fixed credit scheme to achieve the same level of buffering for bursty traffic. For the same amount of memory as a fixed credit scheme, it also has the overall effect of increasing system performance.

FIG. 1 is a flow diagram illustrating a method for handling Transaction Layer Packets (TLPs) from devices in a switch in accordance with a first embodiment of the present invention. At 100, a request for credits for a first TLP may be received from a first device. At 102, a first number of credits is subtracted from a credit pool associated with a first port on which the first device is connected. At 104, it is determined if the amount of credits in the credit pool associated with the first port is less than a first predetermined threshold. At 106, if the amount of credits in the credit pool associated with the first port is less than the first predetermined threshold, a second number of credits is assigned from a shared credit pool to the credit pool associated with the first port.

At 108, a request for credits for a second TLP is received from a second device. At 110, a second number of credits is subtracted from a credit pool associated with a second port on which the second device is connected. At 112, it is determined if the amount of credits in the credit pool associated with the second port is less than a second predetermined threshold. At 114, if the amount of credits in the credit pool associated with the second port is less than the second predetermined threshold, a second number of credits is assigned from the shared credit pool to the credit pool associated with the second port.

Figure 2:
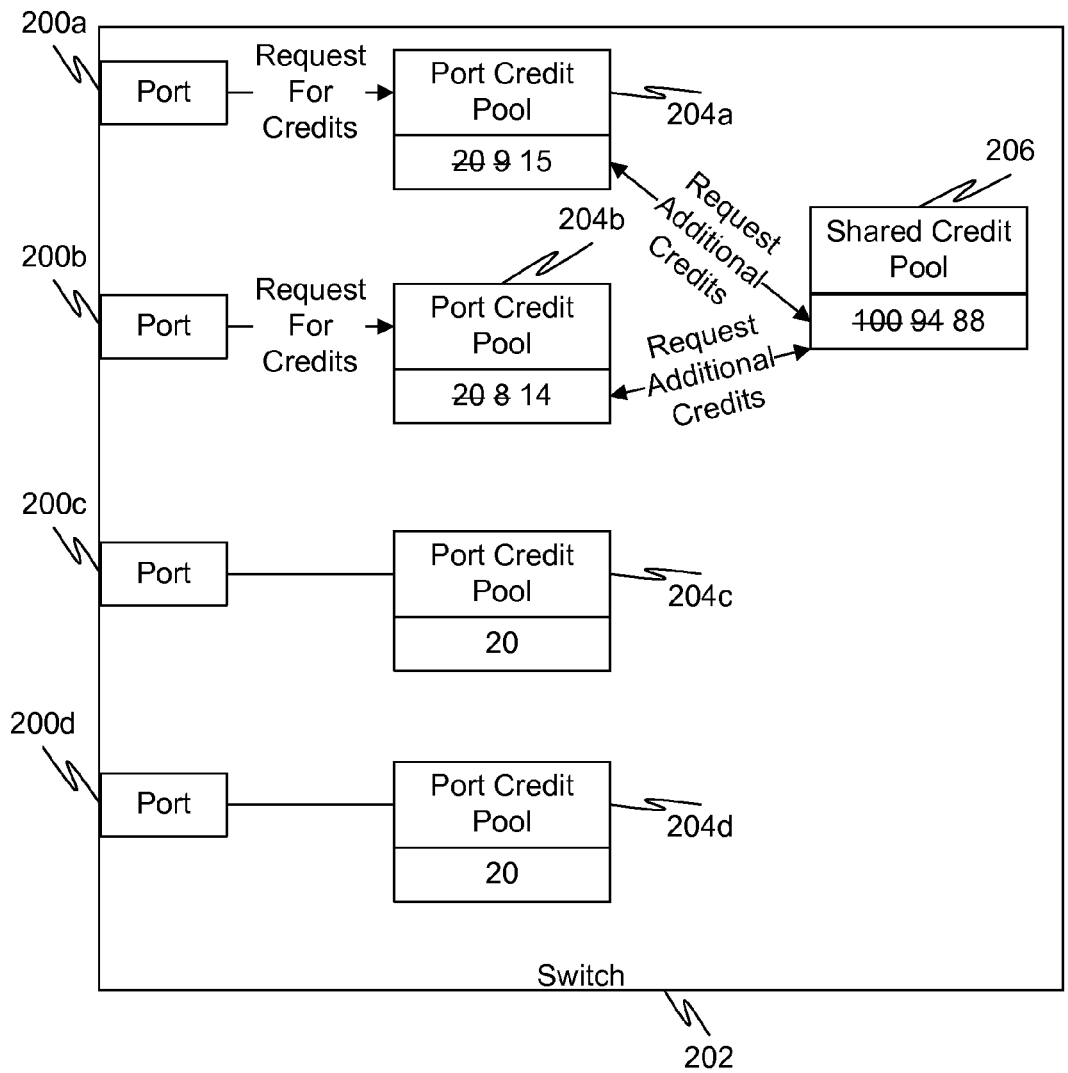
FIG. 2 is a diagram illustrating an example of port credit pools in accordance with the embodiment of the present invention described in FIG. 1 and the corresponding text.

FIG. 2 is a diagram illustrating an example of port credit pools in accordance with the embodiment of the present invention described in FIG. 1 and the corresponding text. As can be seen, each port 200a-200d of the switch 202 has a corresponding port credit pool 204a-204d. Also present in the switch 202 is a shared credit pool 206. When a request for credits related to a TLP is received on first port 200a, a corresponding amount of credits is deducted from the ports pool 204a. For example, in this figure, port credit pool 204a starts with 20 credits. If the first TLP requests 11 credits, 11 is deducted from 20 giving 9 credits. It is then determined if the remaining amount of credits in this pool 204a is less than a predetermined threshold. In this example, suppose the predetermined threshold is 10. Since 9 is less than 10, additional credits need to be transferred from the shared pool 206 to the pool 204a. Here, credits are transferred, bringing the total in credit pool 204a to 15 and reducing the total in shared credit pool 206 to 94. Likewise, when a request for credits related to a TLP is received on the second port 200b, a corresponding amount of credits is deducted from the ports pool 204b. Here, 12 credits are requested, bringing the total in port credit pool 204b down to 8. It is then determined if the remaining amount of credits in this pool 204b is less than a predetermined threshold. Suppose again that the predetermined threshold is 10. Then additional credits need to be transferred from the shared pool 206 to the pool 204b. Here, 6 credits are transferred in from the shared credit pool 206, bringing the total to 14 in the port credit pool 204b and reducing the total in shared credit pool 206 to 88. It should be noted that, while the two predetermined thresholds may be described as first and second predetermined threshold, as in this example, the thresholds may, in fact, be identical. In one embodiment, the additional credits from the shared credit pool would be as much as the initial credit, so 204a would get 11 and 204b would get 12 to return the credits to their initial conditions.

In an embodiment of the present invention, credit calculations occur at the beginning of the receipt of the TLP (such as right after the decoding of the TLP). Error conditions of a TLP may not occur until the end of a TLP, many clock cycles later. In order to speed up credit calculation, in this embodiment an assumption that the TLP is good is made. A later correction to the credits can be made if it turns out a TLP is dropped for any reason. Common reasons for a TLP to be dropped include a failed link CRC check or an End Bad (EDB) symbol on the end.

In an embodiment of the present invention, the system may be designed to handle multiple credit types. In one example, two credit types are envisioned, one for headers and one for payloads. In such a case, multiple implementations of the present invention are possible. In one implementation, each port has two credit pools, one for header credits and one for payload credits, and there are two shared credit pools, one for header credits and one for payload credits. In another implementation, a single shared credit pool may assign credits to both the header credit pools and the payload credit pools. In another example, six credit types are envisioned: (1) Posted Request Header Credits, (2) Posted Request Data Payload Credits, (3) Non-Posted Request Header Credits, (4) Non-Posted Request Data Payload Credits, (5) Completion Header Credits, and (6) Completion Data Payload Credits. Posted Requests include messages and memory writes. Non-posted requests include all reads, I/O, and configuration writes. Completions are associated with corresponding non-posted requests.

Figure 3A:
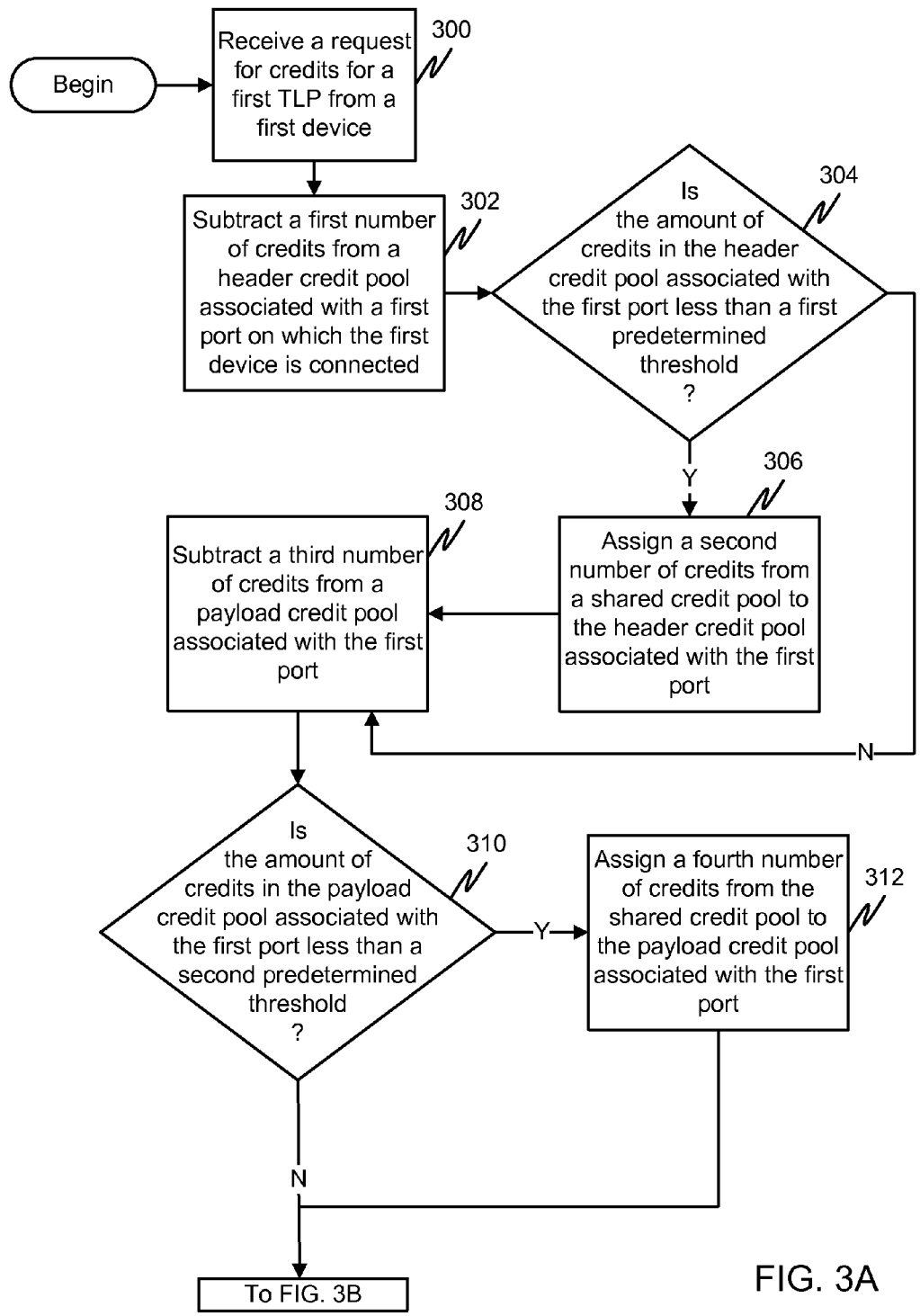
FIGS. 3A and 3B are flow diagrams illustrating a method for handling Transaction Layer Packets (TLPs) from devices in a switch, wherein the TLPs have sizes and contain a header and a payload, in accordance with another embodiment of the present invention.
Figure 3B:
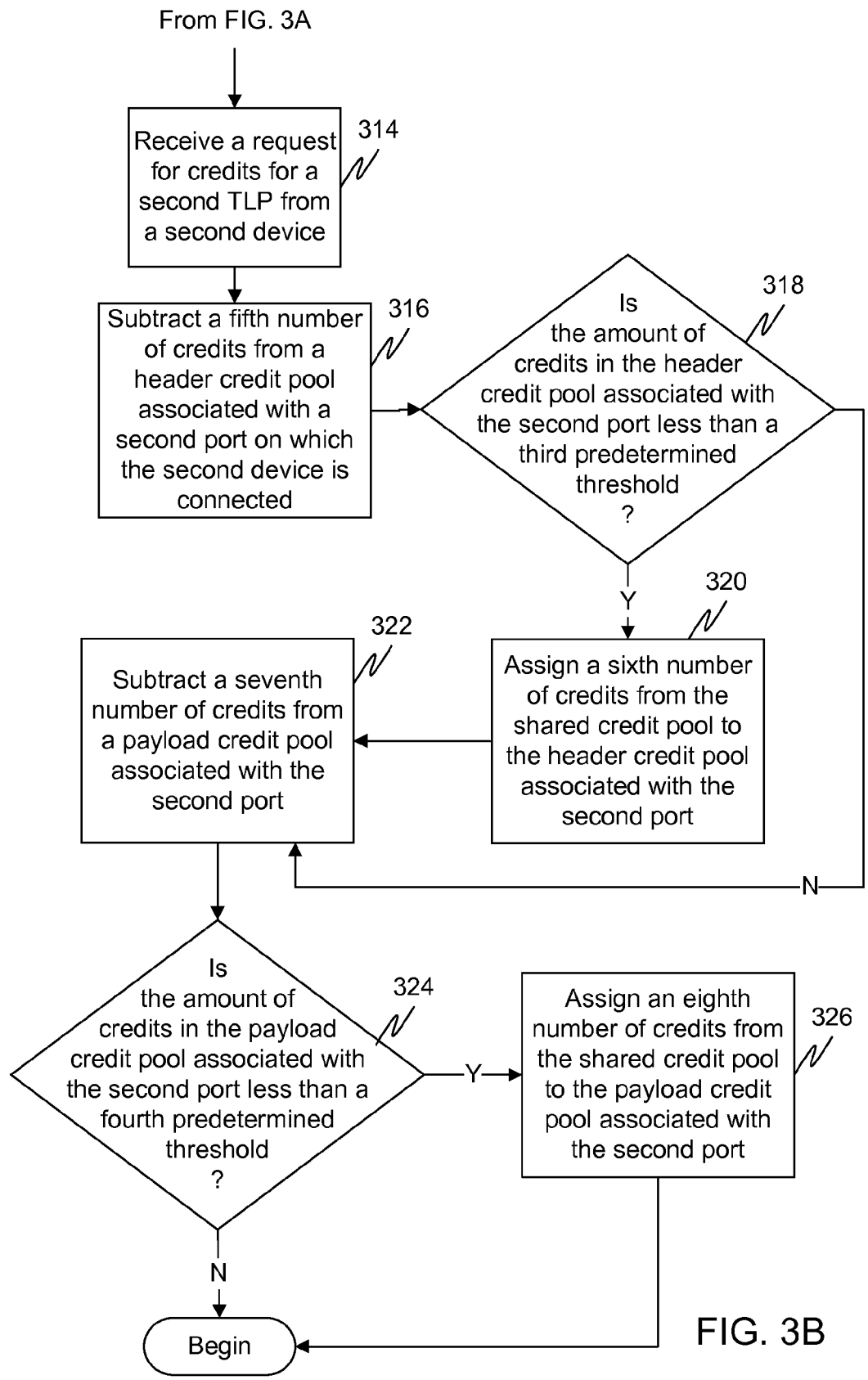

FIGS. 3A and 3B are flow diagrams illustrating a method for handling Transaction Layer Packets (TLPs) from devices in a switch, wherein the TLPs have sizes and contain a header and a payload, in accordance with another embodiment of the present invention. Beginning at FIG. 3A, at 300, a request for credits for a first TLP may be received from a first device. At 302, a first number of credits are subtracted from a header credit pool associated with a first port on which a first device is connected. At 304, it is determined if the amount of credits in the header credit pool associated with the first port is less than a first predetermined threshold. At 306, if the amount of credits in the header credit pool associated with the first port is less than the first predetermined threshold, a second number of credits is assigned from a shared credit pool to the header credit pool associated with the first port.

At 308, a third number of credits is subtracted from a payload credit pool associated with the first port. At 310, it is determined if the amount of credits in the payload credit pool associated with the first port is less than a second predetermined threshold. At 312, if the amount of credits in the payload credit pool associated with the first port is less than the second predetermined threshold, a fourth number of credits is assigned from the shared credit pool to the payload credit pool associated with the first port.

Turning to FIG. 3B, at 314, a request for credits for a second TLP is received from a second device. At 316, a fifth number of credits is subtracted from a header credit pool associated with a second port on which the second device is connected. At 318, it is determined if the amount of credits in the header credit pool associated with the second port is less than a third predetermined threshold. At 320, if the amount of credits in the header credit pool associated with the first port is less than the third predetermined threshold, a sixth number of credits is assigned from the shared credit pool to the header credit pool associated with the second port.

At 322, a seventh number of credits is subtracted from a payload credit pool associated with the second port. At 324, it is determined if the amount of credits in the payload credit pool associated with the second port is less than a fourth predetermined threshold. At 326, if the amount of credits in the payload credit pool associated with the second port is less than the fourth predetermined threshold, an eighth number of credits is assigned from the shared credit pool to the payload credit pool associated with the second port.

Figure 4:
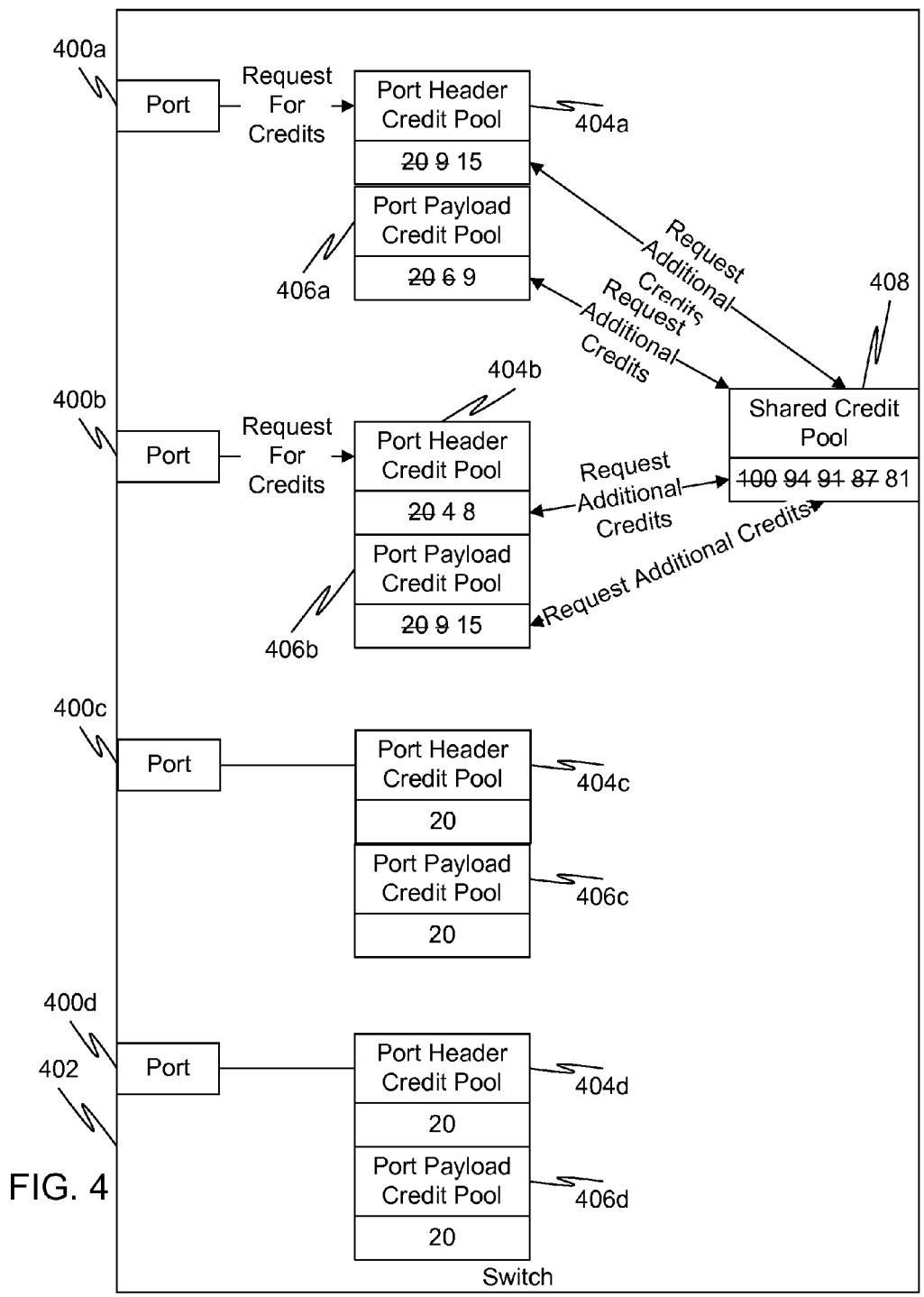
FIG. 4 is a diagram illustrating an example of port credit pools in accordance with the embodiment of the present invention described in FIG. 3 and the corresponding text.

FIG. 4 is a diagram illustrating an example of port credit pools in accordance with the embodiment of the present invention described in FIG. 3 and the corresponding text. As can be seen, each port 400a-400d of the switch 402 has a corresponding port header credit pool 404a-404d and payload credit pool 406a-406d. Also present in the switch 402 is a shared credit pool 408. When a request for credits related to a TLP is received on first port 400a, a corresponding amount of header credits is deducted from the port header credit pool 404a and a corresponding amount of payload credits is deducted from the port payload pool 406a. Here, for example, the original total of 20 in port header credit pool 404a is reduced by 6 to 9 and the original total of 20 in the port payload credit pool is reduced by 14 to 6. It is then determined if the remaining amount of credits in the port header credit pool 404a is less than a predetermined threshold. If so, then additional credits need to be transferred from the shared pool 408 to the pool 404a. Here, for example, 6 credits are sent from shared credit pool 408 to port header credit pool 404a, bringing the total in port header credit pool 404a to 15 and reducing the total in shared credit pool 408 to 94. It is then determined if the remaining amount of credits in the port payload pool 406a is less than a predetermined threshold. If so, then additional credits need to be transferred from the shared pool 408 to the pool 406a. Here, for example, 3 credits are sent from shared credit pool 408 to the pool 406a, bringing the total in port payload credit pool 406a to 9 and reducing the total in shared credit pool 408 to 91.

Likewise, when a request for credits related to a TLP is received on the second port 400b, a corresponding amount of header credits is deducted from the port header credit pool 404b and a corresponding amount of payload credits is deducted from the port payload pool 406b. It is then determined if the remaining amount of credits in the port header credit pool 404b is less than a predetermined threshold. If so, then additional credits need to be transferred from the shared pool 408 to the pool 404b. It is then determined if the remaining amount of credits in the port payload pool 406b is less than a predetermined threshold. If so, then additional credits need to be transferred from the shared pool 408 to the pool 406b.

Figure 5A:
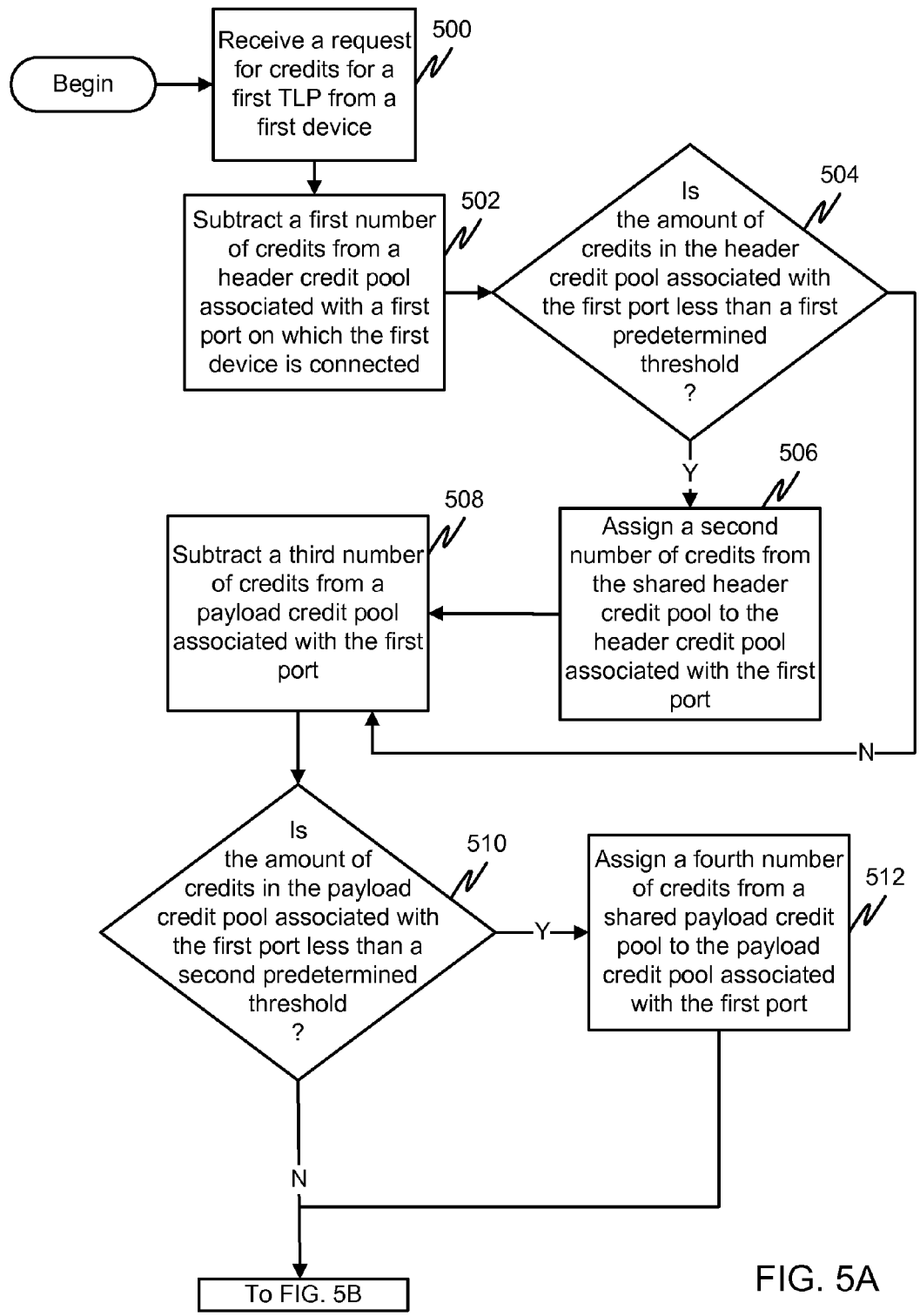
FIGS. 5A and 5B are a flow diagram illustrating a method for handling Transaction Layer Packets (TLPs) from devices in a switch, wherein the TLPs have sizes and contain a header and a payload, in accordance with another embodiment of the present invention.
Figure 5B:
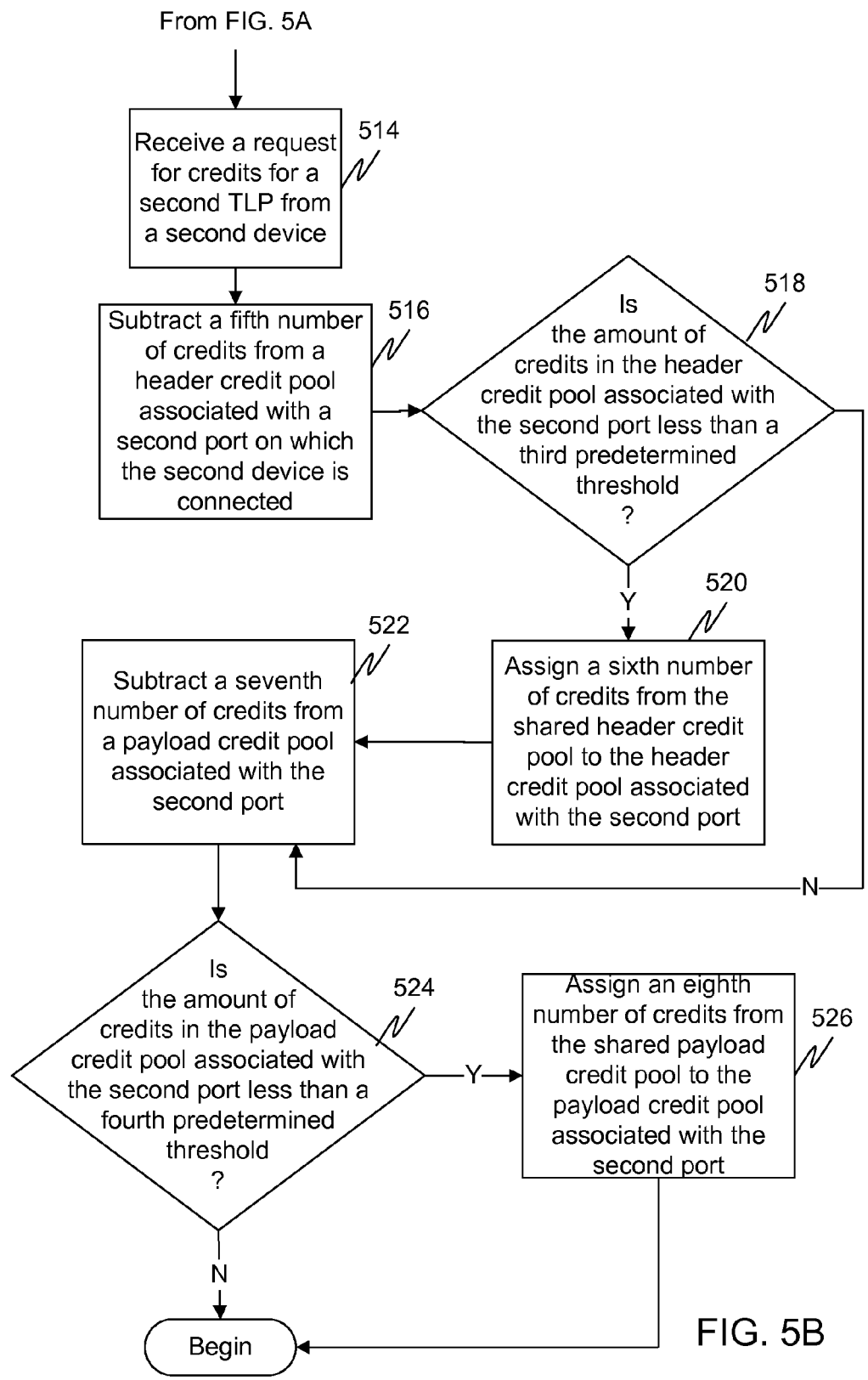

FIGS. 5A and 5B are a flow diagram illustrating a method for handling Transaction Layer Packets (TLPs) from devices in a switch, wherein the TLPs have sizes and contain a header and a payload, in accordance with another embodiment of the present invention. At 500, a request for credits for a first TLP may be received from a first device. At 502, a first number of credits are subtracted from a header credit pool associated with a first port on which a first device is connected. Referring to FIG. 5A, at 504, it is determined if the amount of credits in the header credit pool associated with the first port is less than a first predetermined threshold. At 506, if the amount of credits in the header credit pool associated with the first port is less than the first predetermined threshold, a second number of credits is assigned from a shared header credit pool to the header credit pool associated with the first port.

At 508, a third number of credits is subtracted from a payload credit pool associated with the first port. At 510, it is determined if the amount of credits in the payload credit pool associated with the first port is less than a second predetermined threshold. At 512, if the amount of credits in the payload credit pool associated with the first port is less than the second predetermined threshold, a fourth number of credits is assigned from a shared payload credit pool to the payload credit pool associated with the first port.

Referring to FIG. 5B, at 514, a request for credits for a second TLP is received from a second device. At 516, a fifth number of credits is subtracted from a header credit pool associated with a second port on which the second device is connected. At 518, it is determined if the amount of credits in the header credit pool associated with the second port is less than a third predetermined threshold. At 520, if the amount of credits in the header credit pool associated with the first port is less than the third predetermined threshold, a sixth number of credits is assigned from the shared header credit pool to the header credit pool associated with the second port.

At 522, a seventh number of credits is subtracted from a payload credit pool associated with the second port. At 524, it is determined if the amount of credits in the payload credit pool associated with the second port is less than a fourth predetermined threshold. At 526, if the amount of credits in the payload credit pool associated with the second port is less than the fourth predetermined threshold, an eighth number of credits is assigned from the shared payload credit pool to the payload credit pool associated with the second port.

Figure 6:
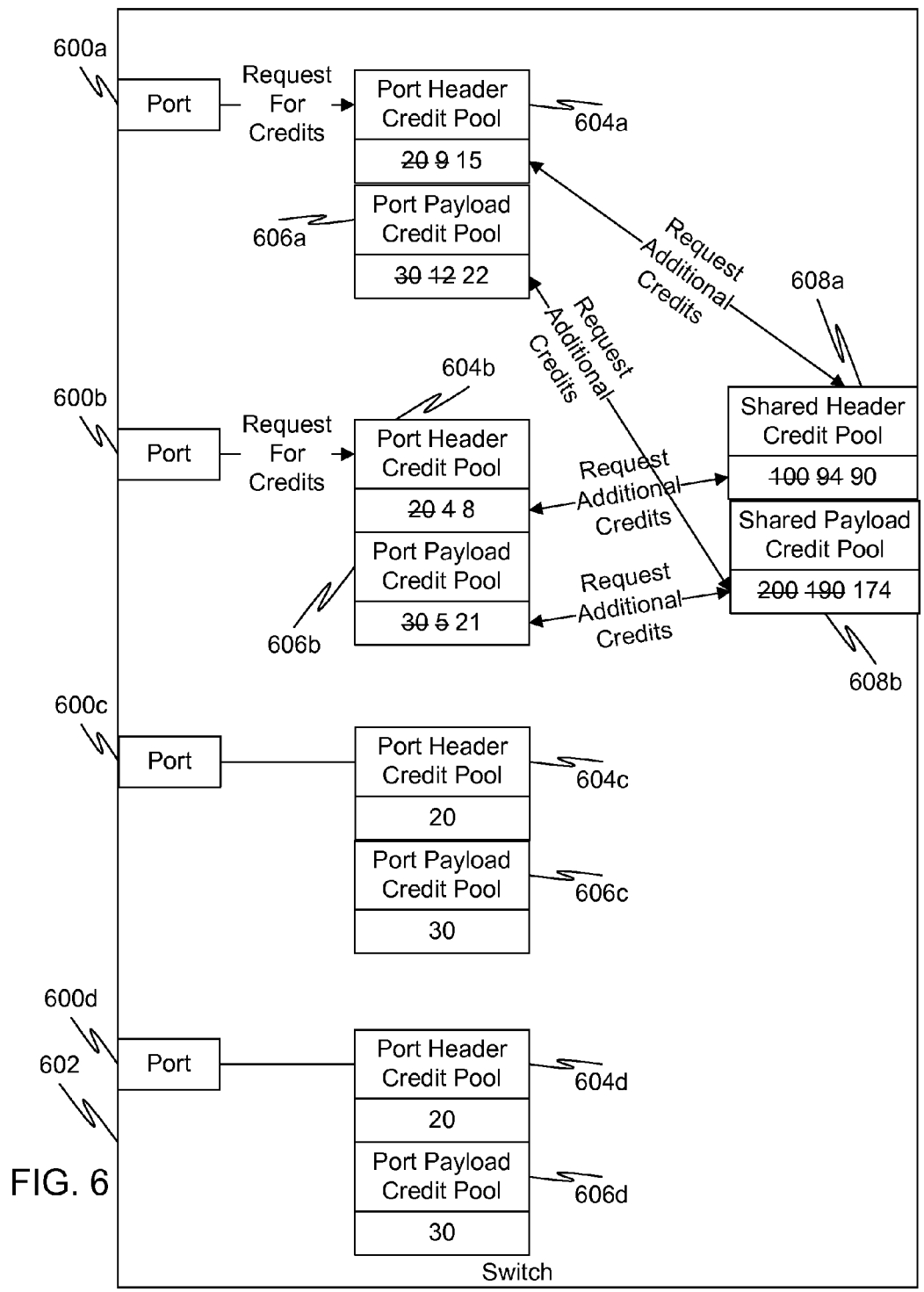
FIG. 6 is a diagram illustrating an example of port credit pools in accordance with the embodiment of the present invention described in FIG. 5 and the corresponding text.

FIG. 6 is a diagram illustrating an example of port credit pools in accordance with the embodiment of the present invention described in FIG. 5 and the corresponding text. As can be seen, each port 600a-600d of the switch 602 has a corresponding port header credit pool 604a-604d and payload credit pool 606a-606d. Also present in the switch 602 is a shared header credit pool 608a and shared payload credit pool 608b. When a request for credits related to a TLP is received on first port 600a, a corresponding amount of header credits is deducted from the port header credit pool 604a and a corresponding amount of payload credits is deducted from the port payload pool 606a. It is then determined if the remaining amount of credits in the port header credit pool 604a is less than a predetermined threshold. If so, then additional credits need to be transferred from the shared header pool 608a to the pool 604a. It is then determined if the remaining amount of credits in the port payload pool 606a is less than a predetermined threshold. If so, then additional credits need to be transferred from the shared payload pool 608b to the pool 606a.

Likewise, when a request for credits related to a TLP is received on the second port 600b, a corresponding amount of header credits is deducted from the port header credit pool 604*b* and a corresponding amount of payload credits is deducted from the port payload pool 606*b*. It is then determined if the remaining amount of credits in the port header credit pool 604*b* is less than a predetermined threshold. If so, then additional credits need to be transferred from the shared header pool 608*a* to the pool 604*b*. It is then determined if the remaining amount of credits in the port payload pool 606*b* is less than a predetermined threshold. If so, then additional credits need to be transferred from the shared payload pool 608*b* to the pool 606*b*.

Other permutations of the methods described in this document are possible as well. For example, a share port pool may be provided for header x type x VC for multiple ports, with an additional shared global pool for header credits.

Also possibility is a mechanism for returning credits to the shared pool. Such a return of credits may occur when the TLP is no longer needed.

Another possibility is a mechanism to deal with the situation where the shared pool does not, or may not, have enough, or the desired number, of credits. Various arbitration policies may be implemented to give credits to requesters in a fair and deterministic way, such as round robin or weighted round robin.

Furthermore, while the present invention is discussed in terms of the PCIe standard, and even the title of the application refers to the PCIe standard, embodiments are foreseen that apply to different standards to follow-up standards to the PCIe standard. As such, the claims shall not be construed as being limited to the PCIe standard unless expressly stated.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for handling a Transaction Layer Packets (TLPs) from devices in a switch, the method comprising:
   receiving, from a first device, a request for credits for a first TLP;
   subtracting a first number of credits from a credit pool associated with a first port on which the first device is connected wherein the first number of credits is calculated based at least partially upon the size of the first TLP;
   determining if the amount of credits in the credit pool associated with the first port is less than a first predetermined threshold; and
   if the amount of credits in the credit pool associated with the first port is less than the first predetermined threshold, assigning a second number of credits from a shared credit pool to the credit pool associated with the first port;
   determining if a TLP is dropped; and
   if the TLP is dropped, crediting the first number of credits back to the credit pool associated with the first port.

2. The method of claim 1, further comprising:
   receiving, from a second device, a request for credits for a second TLP;
   subtracting a second number of credits from a credit pool associated with a second port on which the second device is connected;
   determining if the amount of credits in the credit pool associated with the second port is less than a second predetermined threshold;
   if the amount of credits in the credit pool associated with the second port is less than the second predetermined threshold, assigning a second number of credits from the shared credit pool to the credit pool associated with the second port.

3. A method for handling Transaction Layer Packets (TLPs) from devices in a switch, wherein the TLPs have sizes and contain a header and a payload, the method comprising:
   providing a shared buffer pool to accommodate bursty traffic, the shared buffer pool having a header credit pool and a payload credit pool in which header credits and payload credits are dynamically assignable;
   subtracting a first number of credits from the header credit pool associated with a first port on which a first device is connected;
   determining if the amount of credits in the header credit pool associated with the first port is less than a first predetermined threshold;
   if the amount of credits in the header credit pool associated with the first port is less than the first predetermined threshold, assigning a second number of credits from a shared credit pool to the header credit pool associated with the first port;
   subtracting a third number of credits from the payload credit pool associated with the first port;
   determining if the amount of credits in the payload credit pool associated with the first port is less than a second predetermined threshold; and
   if the amount of credits in the payload credit pool associated with the first port is less than the second predetermined threshold, assigning a fourth number of credits from the shared credit pool to the payload credit pool associated with the first port.

4. The method of claim 3, further comprising:
   determining if the size of a TLP to be received on the first port is considered to be large or small;
   if the size of the TLP to be received on the first port is small, assigning more header credits as the first number of credits and fewer payload credits as the third number of payload credits than if the size of the TLP to be received on the first port is large.

5. A method for handling Transaction Layer Packets (TLPs) from devices in a switch, wherein the TLPs have sizes and contain a header and a payload, the method comprising:
   providing a shared buffer pool to accommodate bursty traffic, the shared buffer pool having a header credit pool and a payload credit pool in which header credits and payload credits are dynamically assignable;
   subtracting a first number of credits from the header credit pool associated with a first port on which a first device is connected;
   determining if the amount of credits in the header credit pool associated with the first port is less than a first predetermined threshold;
   if the amount of credits in the header credit pool associated with the first port is less than the first predetermined threshold, assigning a second number of credits from a shared credit pool to the header credit pool associated with the first port;
   subtracting a third number of credits from the payload credit pool associated with the first port;

determining if the amount of credits in the payload credit pool associated with the first port is less than a second predetermined threshold;

if the amount of credits in the payload credit pool associated with the first port is less than the second predetermined threshold, assigning a fourth number of credits from the shared credit pool to the payload credit pool associated with the first port;

receiving, from a second device, a request for credits for a second TLP;

subtracting a fifth number of credits from a header credit pool associated with a second port on which the second device is connected;

determining if the amount of credits in the header credit pool associated with the second port is less than a third predetermined threshold;

if the amount of credits in the header credit pool associated with the first port is less than the third predetermined threshold, assigning a sixth number of credits from the shared credit pool to the header credit pool associated with the second port;

subtracting a seventh number of credits from a payload credit pool associated with the second port;

determining if the amount of credits in the payload credit pool associated with the second port is less than a fourth predetermined threshold; and if the amount of credits in the payload credit pool associated with the second port is less than the fourth predetermined threshold, assigning an eighth number of credits from the shared credit pool to the payload credit pool associated with the second port.

6. A method for handling a Transaction Layer Packets (TLPs) from device in a switch, wherein the TLPs have sizes and contain a header and a payload, the method comprising:

providing a shared buffer pool to accommodate bursty traffic, the shared buffer pool having a header credit pool and a payload credit pool in which header credits and payload credits are dynamically assignable, wherein the buffer credit is acquired from a port pool associated with a first device;

subtracting a first number of credits from a header credit pool associated with a first port on which the first device is connected;

determining if the amount of credits in the header credit pool associated with the first port is less than a first predetermined threshold;

if the amount of credits in the header credit pool associated with the first port is less than the first predetermined threshold, assigning a second number of credits from a shared header credit pool to the header credit pool associated with the first port;

subtracting a third number of credits from a payload credit pool associated with the first port;

determining if the amount of credits in the payload credit pool associated with the first port is less than a second predetermined threshold; and if the amount of credits in the payload credit pool associated with the first port is less than the second predetermined threshold, assigning a fourth number of credits from a shared payload credit pool to the payload credit pool associated with the first port.

7. The method of claim 6, further comprising:

determining if the size of a TLP to be received on the first port is considered to be large or small;

if the size of the TLP to be received on the first port is small, assigning more header credits as the first number of credits and fewer payload credits as the third number of payload credits than if the size of the TLP to be received on the first port is large.

8. A method for handling a Transaction Layer Packets (TLPs) from device in a switch, wherein the TLPs have sizes and contain a header and a payload, the method comprising:

providing a shared buffer pool to accommodate bursty traffic, the shared buffer pool having a header credit pool and a payload credit pool in which header credits and payload credits are dynamically assignable, wherein the buffer credit is acquired from a port pool associated with a first device;

subtracting a first number of credits from a header credit pool associated with a first port on which the first device is connected;

determining if the amount of credits in the header credit pool associated with the first port is less than a first predetermined threshold;

if the amount of credits in the header credit pool associated with the first port is less than the first predetermined threshold, assigning a second number of credits from a shared header credit pool to the header credit pool associated with the first port;

subtracting a third number of credits from a payload credit pool associated with the first port;

determining if the amount of credits in the payload credit pool associated with the first port is less than a second predetermined threshold;

if the amount of credits in the payload credit pool associated with the first port is less than the second predetermined threshold, assigning a fourth number of credits from a shared payload credit pool to the payload credit pool associated with the first port;

receiving, from a second device, a request for credits for a second TLP;

subtracting a fifth number of credits from a header credit pool associated with a second port on which the second device is connected;

determining if the amount of credits in the header credit pool associated with the second port is less than a third predetermined threshold;

if the amount of credits in the header credit pool associated with the first port is less than the third predetermined threshold, assigning a sixth number of credits from the shared header credit pool to the header credit pool associated with the second port;

subtracting a seventh number of credits from a payload credit pool associated with the second port;

determining if the amount of credits in the payload credit pool associated with the second port is less than a fourth predetermined threshold; and if the amount of credits in the payload credit pool associated with the second port is less than the fourth predetermined threshold, assigning an eighth number of credits from the shared payload credit pool to the payload credit pool associated with the second port.

9. A switch comprising:

a plurality of ports;

for each of said plurality of ports, stored in a memory, a header credit pool and a payload credit pool associated with the port;

a shared credit pool stored in a memory;

a processor configured to:

receive, from a first device, a request for credits for a first TLP;

subtract a first number of credits from a header credit pool associated with a first port on which the first device is connected, wherein the first number of credits is calculated based at least partially upon the size of the first TLP;
determine if the amount of credits in the header credit pool associated with the first port is less than a first predetermined threshold;
if the amount of credits in the header credit pool associated with the first port is less than the first predetermined threshold, assign a second number of credits from a shared credit pool to the header credit pool associated with the first port;
subtract a third number of credits from a payload credit pool associated with the first port;
determine if the amount of credits in the payload credit pool associated with the first port is less than a second predetermined threshold;
if the amount of credits in the payload credit pool associated with the first port is less than the second predetermined threshold, assign a fourth number of credits from the shared credit pool to the payload credit pool associated with the first port;
determine if a TLP is dropped; and
if the TLP is dropped, credit the first number of credits back to the credit pool associated with the first port.

10. A switch comprising:
a plurality of ports;
for each of said plurality of ports, stored in a memory, a header credit pool and a payload credit pool associated with the port;
a shared header credit pool stored in a memory;
a shared payload credit pool stored in a memory;
a processor configured to:
receive, from a first device, a request for credits for a first TLP;
subtract a first number of credits from a header credit pool associated with a first port on which the first device is connected, wherein the first number of credits is calculated based at least partially upon the size of the first TLP;
determine if the amount of credits in the header credit pool associated with the first port is less than a first predetermined threshold;
if the amount of credits in the header credit pool associated with the first port is less than the first predetermined threshold, assign a second number of credits from a shared header credit pool to the header credit pool associated with the first port;
subtract a third number of credits from a payload credit pool associated with the first port;
determine if the amount of credits in the payload credit pool associated with the first port is less than a second predetermined threshold; and
if the amount of credits in the payload credit pool associated with the first port is less than the second predetermined threshold, assign a fourth number of credits from a shared payload credit pool to the payload credit pool associated with the first port;
determine if a TLP is dropped; and
if the TLP is dropped, credit the first number of credits back to the credit pool associated with the first port.

* * * * *